(12) United States Patent
Wagner et al.

(10) Patent No.: US 7,410,527 B2
(45) Date of Patent: Aug. 12, 2008

(54) DEVICE FOR SEPARATING LIQUID COMPONENTS FROM A GAS FLOW WITH A CYCLONE, A TANK AND A CYCLONE TANK TURBULENCE BRAKE

(75) Inventors: Jürgen Wagner, Asselfingen (DE); Armin Praska, Rimpar (DE); Dieter Grafl, Ulm (DE); Kai-Uwe Lemke, Ulm (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 521 days.

(21) Appl. No.: 11/127,579

(22) Filed: May 12, 2005

(65) Prior Publication Data
US 2005/0279700 A1    Dec. 22, 2005

(30) Foreign Application Priority Data
May 13, 2004    (DE) .................. 10 2004 023 813

(51) Int. Cl.
*B01D 45/12* (2006.01)
(52) U.S. Cl. ..................... 95/271; 55/424; 55/459.1; 55/466
(58) Field of Classification Search ............ 55/426, 55/429, 459.1, 466; 95/271; 210/512.1, 210/788
See application file for complete search history.

(56) References Cited

U.S. PATENT DOCUMENTS

| 4,622,051 A | * | 11/1986 | Polach et al. ............... 55/417 |
| 4,964,898 A | | 10/1990 | Toda |
| 6,776,823 B2 | * | 8/2004 | Hotta et al. ................. 96/168 |

FOREIGN PATENT DOCUMENTS

| DE | 40 37 983 | 6/1992 |
| DE | 198 38 247 | 2/2000 |
| GB | 1 252 228 | 11/1971 |

OTHER PUBLICATIONS

Patent Abstracts of Japan for Publication No. 2003205212 A (Application No. 2002006208) (1 page), Jul. 22, 2003.
Derwent English Abstract for DE 40 37 983 (1 page), Jun. 4, 1992.
Derwent English Abstract for DE 198 38 247 (1 page), Feb. 24, 2000.

* cited by examiner

*Primary Examiner*—Robert A Hopkins
(74) *Attorney, Agent, or Firm*—Marshall & Melhorn, LLC

(57) ABSTRACT

A separator for separating liquid components, in particular oil components, from a gas flow is disclosed including a cyclone and a tank. The liquid separator has a cyclone 1 with a separating chamber 2 including gas supply 3 and gas discharge 4 and a tank 5 which is connected to the cyclone 1 via a connection opening 6. The interior of the tank 5 is filled at least partially with a porous open-pore material 7 in order to interrupt the flow, dampen the flow, dampen the oscillations and/or discharge the liquid.

17 Claims, 8 Drawing Sheets

DEVICE FOR SEPARATING LIQUID COMPONENTS FROM A GAS FLOW WITH A CYCLONE, A TANK AND A CYCLONE TANK TURBULENCE BRAKE

FIELD OF TECHNOLOGY

The present invention relates to a separator for separating liquid components, in particular oil components, from a gas flow by means of a cyclone for removing the liquid components from the gas flow and by means of a tank for collecting the liquid components removed from the gas flow. The invention likewise relates to a corresponding method.

BACKGROUND

Devices and methods for separating liquid components from a gas flow by means of a cyclone and a collection tank are already known from the state of the art. Also corresponding devices or methods are known for separating solid, in particular pulverised particles. In the known devices or methods according to the state of the art, turbulences and/or oscillating air columns are produced due to the connection opening between cyclone and tank, in particular at very high flow rates, by means of which drainage of the liquid or discharge of the solid particles into the tank is prevented. In methods or devices for separating solid particles, cones or baffles are therefore fitted in part under the tank inlet opening. This in fact improves the situation, however particles are swirled upwardly for example by secondary turbulence from the opening towards the transition from the conical part to the cylindrical part of the cyclone.

SUMMARY

It is therefore the object of the present invention, starting from the state of the art, to make available a liquid separator having a cyclone and a tank connected thereto, which avoids turbulences, droplet fragmentation, energy-destroying flows, secondary turbulences and/or oscillating air columns in the cyclone, in the tank and/or in the transition region from the cyclone to the tank, and hence ensures an improved level of separation of the liquid and a reduction in pressure loss in the cyclone.

This object is achieved by the liquid separator according to patent claim 1 and the liquid separating method according to patent claim 13. Advantageous developments of the method according to the invention or of the device according to the invention are described in the respective dependent claims.

It is an essential aspect of the present invention that a porous and open-pore solid material or an oscillation-dampening, flow-dampening, oil-discharging material is introduced into the tank subsequent to the cyclone and/or into the cyclone in the transition region to the tank in order to collect the liquid components removed from the gas flow (in particular the oil components). The porous open-pore solid material can hereby completely fill the tank, the tank chamber must however not necessarily be filled completely but can also be filled only partially with the solid material, The solid material interrupts and/or dampens the gas flow and avoids the formation of turbulences, droplet fragmentation and/or oscillating air columns in the cyclone, in the tank and/or in the transition region of the same.

The pores of the porous open-pore solid material or of the porous open-pore material should thereby be configured with respect to their size and/or shape such that the material does not clog. This means that the pores must be sufficiently fine in order that the material can fulfil its above-described objectives, i.e. significantly smaller than the diameter of the connection opening between tank and cyclone, but they must not be too fine in order to prevent clogging of the material by the liquid components.

The material can hereby be chosen or configured preferably such that a capillary effect of the material occurs, which assists the drainage or discharge of the liquid in the direction of the tank outlet (i.e. for example when disposed below the cyclone with the tank outlet in the base in the downwards direction).

The pores must then be large enough in order to allow the capillary forces to take effect. The draining or discharge effect is produced then predominantly by the capillary forces.

The porous solid material can be placed simply in the interior of the tank or of the cyclone (in the region of the transition to the tank), it can however also be welded, glued and/or clipped on (for example onto a tank internal wall, cyclone internal wall or also onto an internal wall of the connection opening between tank and cyclone). Placing of the material against the connection opening from the cyclone to the tank must hereby be ensured without the connection opening being able to be blocked or becoming blocked.

The porous solid materials which are used can concern for example non-woven materials (in particular made of plastic material), knitted materials and/or woven materials (in particular made of metal) and/or fillers made of glass, glass fibres, fibres, metals, plastic materials or ceramics. The listed materials can hereby be used or introduced individually or also in arbitrary combinations. As already described, the tank chamber need not necessarily hereby be completely filled, but it may be.

A liquid separator according to the invention has at least one cyclone with separating chamber for separating liquid components, in particular oil components, from a gas flow, a gas supply for supplying the liquid-contaminated gas flow discharging into the separating chamber and a gas discharge leading out of the separating chamber with which the discharge of the liquid-freed gas flow is ensured. Furthermore, it has at least one tank for collecting the liquid components removed from the gas flow, the tank being connected to the cyclone via a connection opening, by means of which the liquid components removed from the gas flow are transferable from the separating chamber into the tank. The liquid separator according to the invention is now characterised in that the interior at least of one tank and/or of the connection opening and/or of the at least one cyclone in the transition region to the tank is filled at least partially with a porous open-pore solid material in order to interrupt the flow, dampen the flow, dampen the oscillations and/or discharge the liquid.

In an advantageous embodiment, at least one tank has a liquid storage region and a transition region for conducting the liquid components removed from the gas flow in the separating chamber into the liquid storage region, the porous open-pore solid material at least partially filling the liquid storage region and/or the transition region.

The solid material is hereby chosen preferably such that the relative pore volume or the ratio of the volume of the pores to the total volume (solid volume including pore volume) of the porous open-pore solid material is greater than 30%, preferably greater than 45%, preferably greater than 60%.

The average pore size of the porous open-pore solid material is advantageously significantly smaller than the diameter of the connection opening between tank and cyclone and/or is advantageously chosen such that the liquid discharge can be assisted by capillary forces or can be effected at least partially by capillary forces and/or is advantageously less than 10%, in particular preferably less than 5%, in particular preferably less than 2%, in particular preferably less than 1%, in particular preferably less than 0.5%, in particular preferably less than 0.1% of the diameter of the connection opening.

In a further advantageous embodiment, the porous solid material has non-woven materials, in particular non-woven materials containing plastic material or comprising such. In another preferred embodiment, the solid material contains knitted materials and/or woven materials, in particular made of metal, or comprising such. In a further advantageous embodiment variant, fillers containing or comprising in particular metal and/or plastic material and/or ceramics and/or fibres and/or glass fibres and/or glass and/or foams are used as solid material fillers.

In a further advantageous embodiment, the tank and/or the cyclone is filled only in the region of and/or around the connection opening with the porous open-pore solid material, and/or the porous open-pore solid material is disposed abutting directly against the connection opening.

In a further variant, the cyclone is constructed rotationsymmetrically about an axis and the porous solid material fills the tank over its entire cross-section in a plane perpendicular to this axis of the cyclone.

Advantageously, the open-pore porous solid material is at least partially fixed, welded and/or clipped on at least one internal wall of the tank and/or on the connection opening and/or at the transition or in the transition region from the cyclone to the tank. The solid material can alternatively thereto or even additionally be connected and/or glued at least partially to at least one internal wall of the tank and/or to the connection opening and/or to the transition or to the transition region from the cyclone to the tank.

In a further variant, the tank has a discharge device for discharging liquid collected in the tank. Preferably, the discharge device has a valve, in particular a non-return valve, a siphon and/or a discharge pipe.

The above-described liquid separator is distinguished by the advantages of a significant improvement in the level of separation of the liquid and in a significant reduction in pressure loss in the cyclone.

A liquid separator according to the invention can be configured or used in one of the subsequently represented examples, these examples merely explaining the invention but not restricting it. In the represented examples, identical reference numbers are used for the same or corresponding components of the liquid separator.

DETAIL DESCRIPTION

Figure 1A:
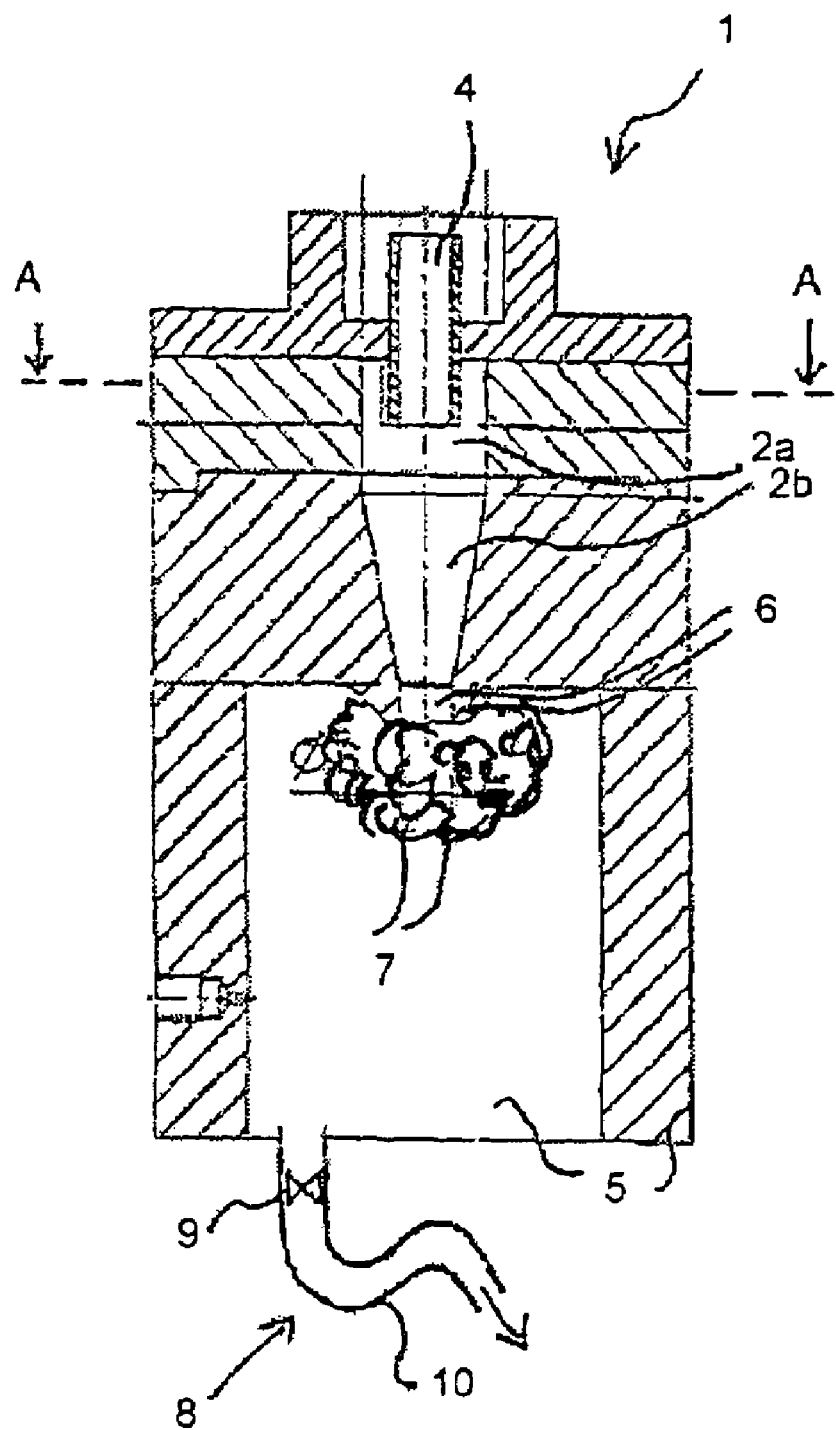
FIG. 1 shows a first liquid separator with a welded-on non-woven material made of plastic material.
Figure 1B:
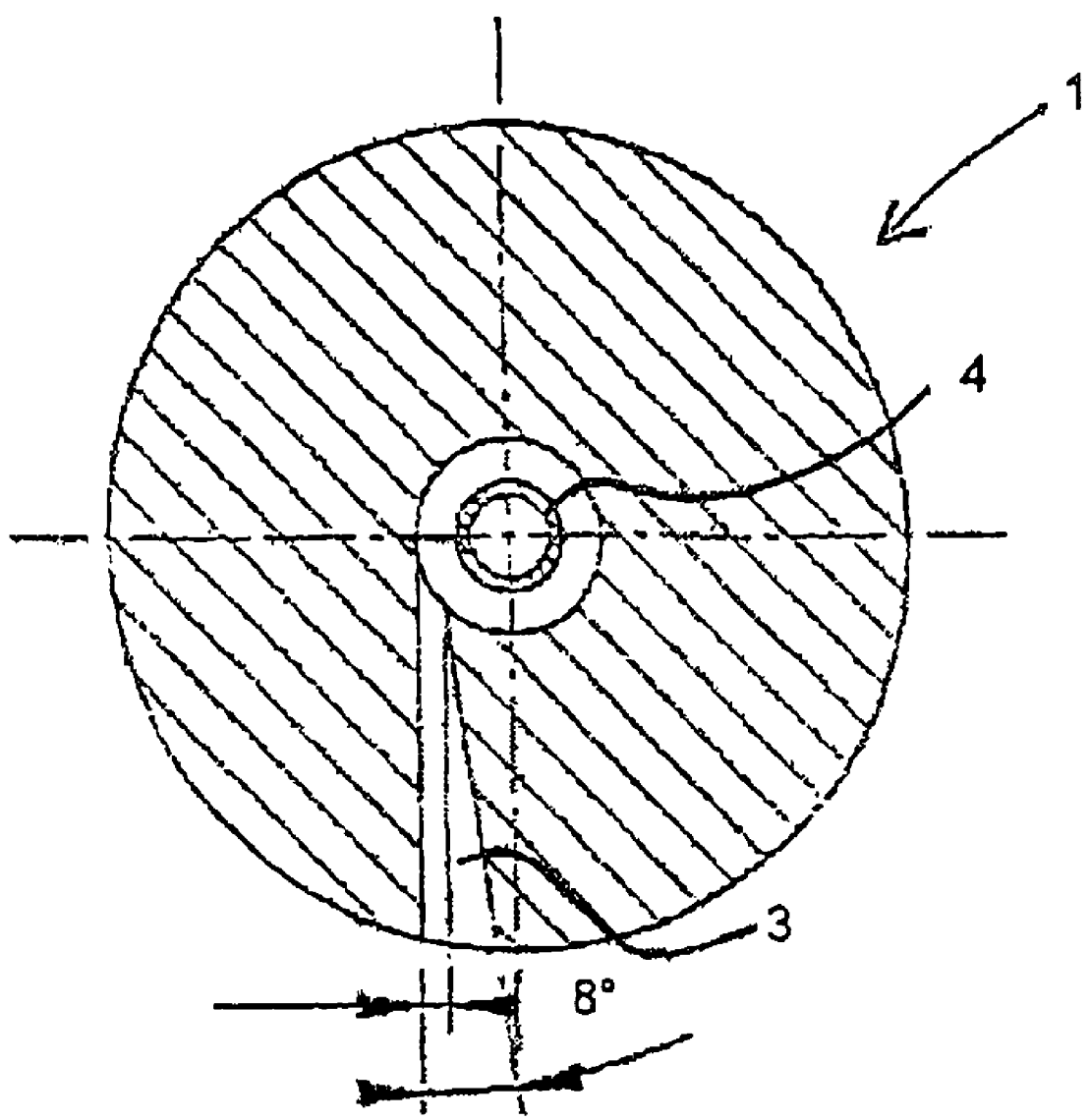

FIG. 1A shows a liquid separator according to the invention, the tank of which is partially filled with a plastic material non-woven material which is welded securely in the region of the connection opening between cyclone and tank. The upper part of the liquid separator comprises a cyclone 1 which has a separating chamber 2. The separating chamber 2 has an upper cylindrical portion 2a and, disposed thereunder, a frustoconical (downwardly tapered) portion 2b. As can be seen in FIG. 1B, which represents a section through the liquid separator in the plane A-A, a gas supply 3 discharges into the cylindrical part 2a of the separating chamber 2. This gas supply 3 discharges essentially tangentially into the cylindrical part 2a of the separating chamber 2. From the cylindrical part 2a of the separating chamber 2, a gas discharge 4 leads upwardly, said gas discharge being configured in the present case in the form of a cylindrical pipe (dip tube), but it can also be configured in another form. At the lower end of the separating chamber 2 or directly below the frustoconically configured part of the separating chamber 2, a connection opening 6 is disposed. This connection opening 6 is configured as a truncated cone with a cylindrical interior. The connection opening 6 connects the separating chamber 2 to the tank 5 which is disposed directly under the separating chamber 2. The tank 5 likewise has a cylindrical configuration. The separating chamber 2 or the cylindrically configured part 2a thereof and the frustoconically configured part 2b thereof, the gas discharge 4 or the corresponding dip tube 4, the frustoconical connection opening 6 and the cylindrical tank are disposed such that their, cylindrical axes coincide. The inner volumes of the mentioned components are characterised in the Figure by the lack of hatching. The components surrounding the inner volumes or forming them or wall components of the liquid separator are characterised in the Figure by hatching. At the lower end of the tank 5 a discharge device 8 leads out of the tank 5, said device having a discharge pipe 10, which has a swan neck configuration, and a valve 9. Observed with reference to the tank, the valve 9 is hereby disposed at the beginning of the discharge pipe 10 or within the discharge pipe 10 directly after the opening to the tank 5. Now it is crucial that, in the shown liquid separator, a porous open-pore solid material in the form of a plastic material non-woven material 7 is weldedon in the region of the frustoconical wall of the connection opening 6. The plastic material non-woven material 7 is hereby welded-on on the outside to the truncated cone, which forms the cylindrical connection opening 6 as the inner volume. The welding-on is effected such that downwardly the connection opening 6 is covered completely by the non-woven material 7. The non-woven material 7 abuts against the connection opening 6 between cyclone 1 and tank 5 such that the opening does not become blocked. As an alternative to welding-on, the non-woven material 7 can also be glued or clipped on. In the shown case, the non-woven material 7 hence fills the tank interior only partially in the upper region and in this region not over its entire cross-section (parallel to the plane A-A).

The gas flow contaminated with liquid components is supplied to the cyclone 1 by means of the gas supply 3. The gas supply is hereby effected such that the liquid-contaminated gas flows essentially tangentially into the cylindrical upper portion of the cyclone 1. The gas now flows essentially helically along the internal walls of the cyclone from the cylindrical upper portion of the separating chamber 2 into the frustoconical lower portion of the separating chamber 2. Due to the hereby occurring forces, the liquid components, in the represented case oil components, are removed from the gas flow and run downwardly through the connection opening 6 into the interior of the tank 5. The pure gas, freed at least partially of the liquid components or oil components, leaves the cyclone 1 or the separating chamber 2 through the upwardly discharging gas discharge 4. The porous open-pore plastic material non-woven material 7 introduced into the tank interior directly below the connection opening 6 interrupts or dampens the gas flow occurring in the region of the tank interior 5, of the cyclone 1 and of the opening 6 in such a manner that the turbulences occurring without the non-woven material 7 are avoided, which turbulences entrain oil components again from the tank interior upwards into the frustoconical part of the separating chamber 2 and hence significantly impair the liquid separation. Energy-destroying flows, turbulences or oscillating air columns, which otherwise are produced by the opening between cyclone 1 and tank 5 and caused by the very high flow rates and by means of which the discharge of the oil into the tank is prevented or impaired, are hence avoided due to the introduced non-woven material. Oil particles are hence prevented from swirling upwards by means of turbulence or secondary turbulence up to the transition of the frustoconical to the cylindrical part of the separating chamber 2. The pore size of the non-woven material 7 is chosen significantly smaller than the connection opening 6 so that in particular capillary forces ensure the oil discharge through the non-woven material 7 downwardly in the direction of the discharge 8. The introduction of the non-woven material 7, as described, ensures significant improvement in the level of separation and significant improvement in the pressure loss in the cyclone.

Figure 2:
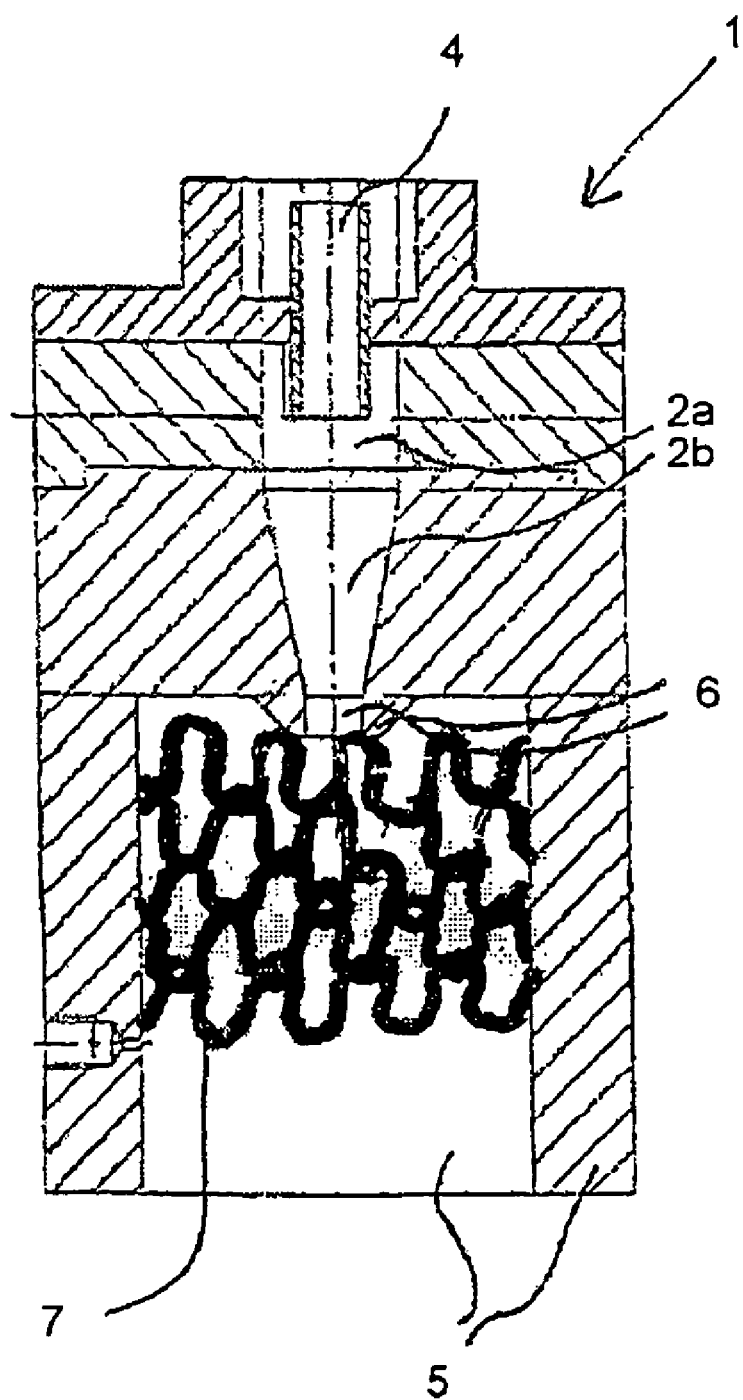
FIG. 2 shows a second liquid separator with a clipped-on knitted metal material.

FIG. 2 shows a further liquid separator according to the invention, in the tank of which a knitted metal material is introduced. The represented device has fundamentally the same components as the liquid separator described in FIG. 1, here as in the following Figures the discharge device 8 (comprising discharge pipe 10 and valve 9) not being shown. In contrast to the case represented in FIG. 1, a knitted metal material is disposed here directly below the connection opening 6. The knitted metal material is hereby clipped securely to the side walls of the tank 5. In contrast to the case represented in FIG. 1, the porous open-pore solid material (here the knitted metal material) fills the interior of the tank 5 in the direction perpendicular to the cylindrical axis of the tank over the entire diameter. As in FIG. 1, the entire interior of the tank 5 is however not filled here also, in the represented case, only the upper two thirds of the tank interior 5 are filled by the knitted metal material. As in the case of the plastic material non-woven material described with reference to FIG. 1, the open-pore material 7 (i.e. here the knitted metal material) must also be so fine in this case that sufficient flow interruption, flow dampening and/or oscillation dampening occurs, but must not be too fine since it otherwise becomes clogged with oil components. The average pore size of the knitted metal material in the present case is approximately 1% of the average diameter of the opening 6.

Due to the chosen pore size, a capillary effect occurs within the knitted metal material 7, as also described in the first example, which contributes substantially to the separated oil being conveyed downwardly within the tank 5 (i.e. towards the discharge device 8).

The mode of operation of the liquid separator and of the porous knitted metal material 7 hence correspond to the case represented in FIG. 1.

Figure 3:
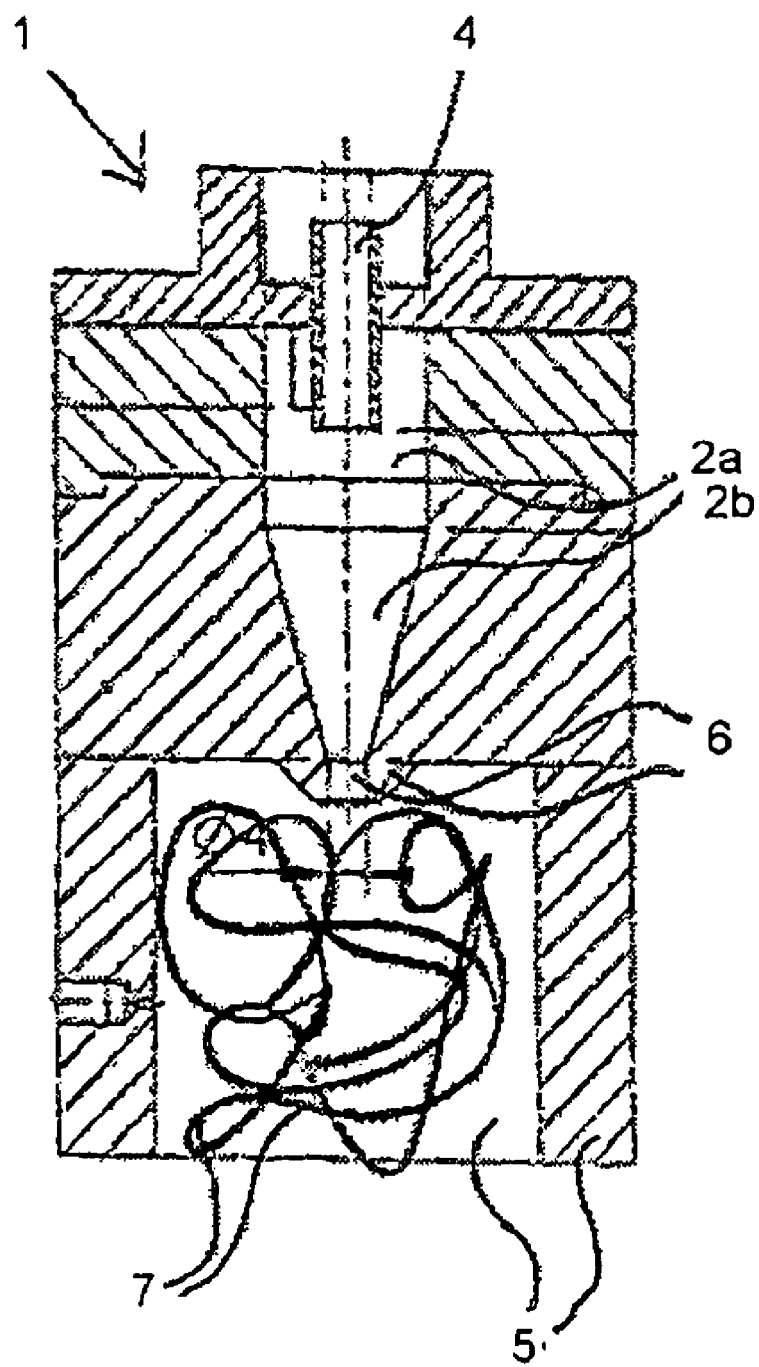
FIG. 3 shows a further liquid separator with inserted glass fibres.

FIG. 3 shows a further liquid separator according to the invention which operates with glass fibres as the porous open-pore solid material. The construction and the mode of operation of the represented liquid separator correspond hereby fundamentally to the devices shown in FIG. 1 and FIG. 2. In contrast thereto, a glass fibre bundle 7 is however placed in the tank interior as porous open-pore solid material. In this case, the tank interior is completely filled with the glass fibre bundle 7 so that simple insertion of the glass fibre bundle 7 suffices here and the latter need not be welded, glued or clipped on.

Figure 4:
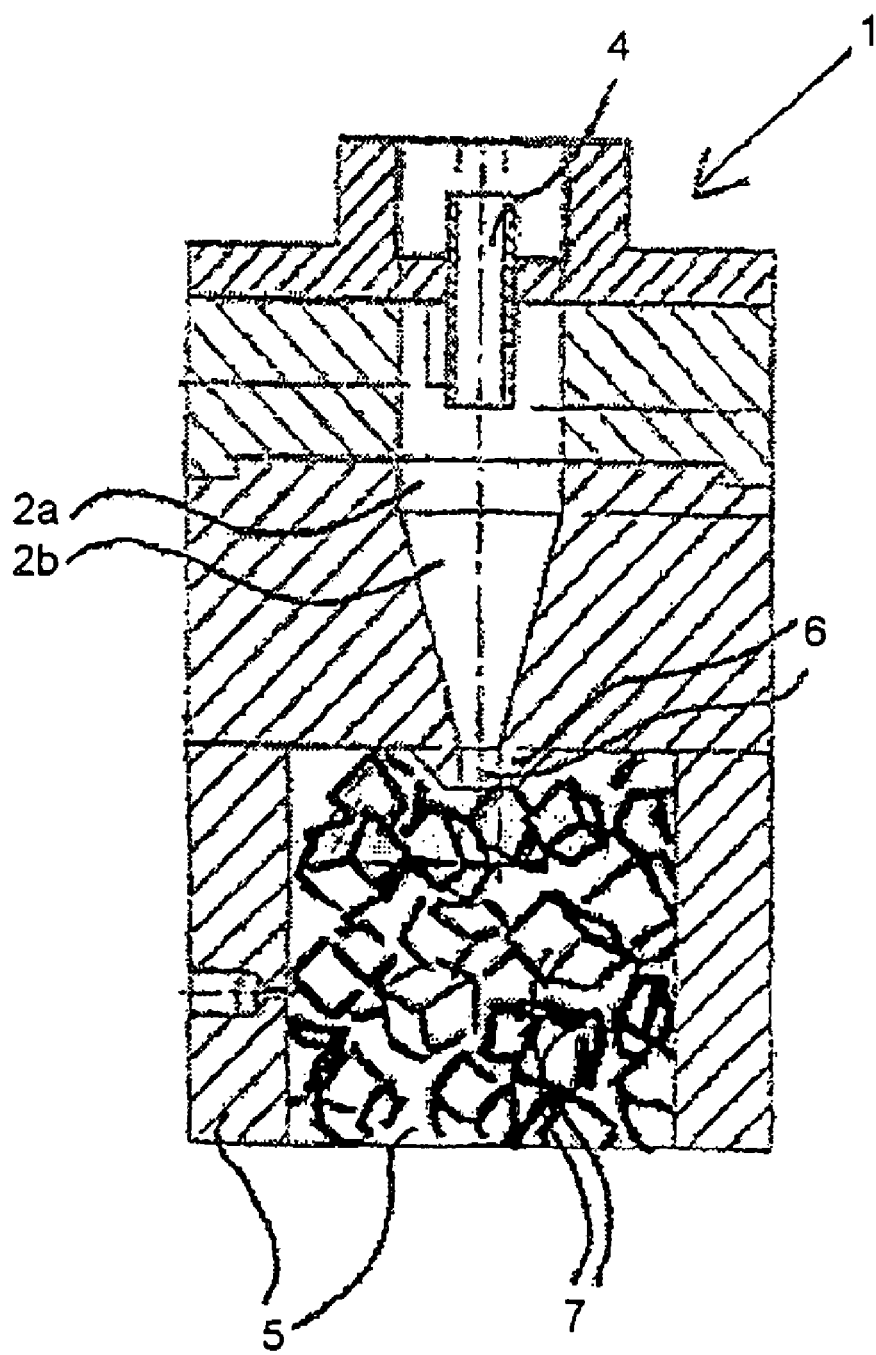
FIG. 4 shows a further liquid separator with introduced fillers made of ceramics.

FIG. 4 shows a further liquid separator which operates by means of introduced plastic material fillers. The basic construction and the basic mode of operation of the represented device hereby correspond to the cases described in the preceding FIGS. 1 to 3. In contrast to the previously described cases, fillers 7 made of plastic material are however introduced into the tank interior 5. The fillers 7 hereby fill the tank interior 5 completely so that simple introduction or arrangement of the fillers 7 in the tank interior suffices and these do not require to be welded, glued or clipped on. The individual fillers are disposed, due to their geometry or their configuration (here essentially square), such that a porous and open-pore solid material arrangement is produced, by means of which the gas flow can be interrupted and/or dampened, by means of which oscillations of the gas flows can be dampened and by means of which the oil within the tank interior 5 can be discharged downwardly through the solid material arrangement 7 in the direction of the outlet 8.

Figure 5:
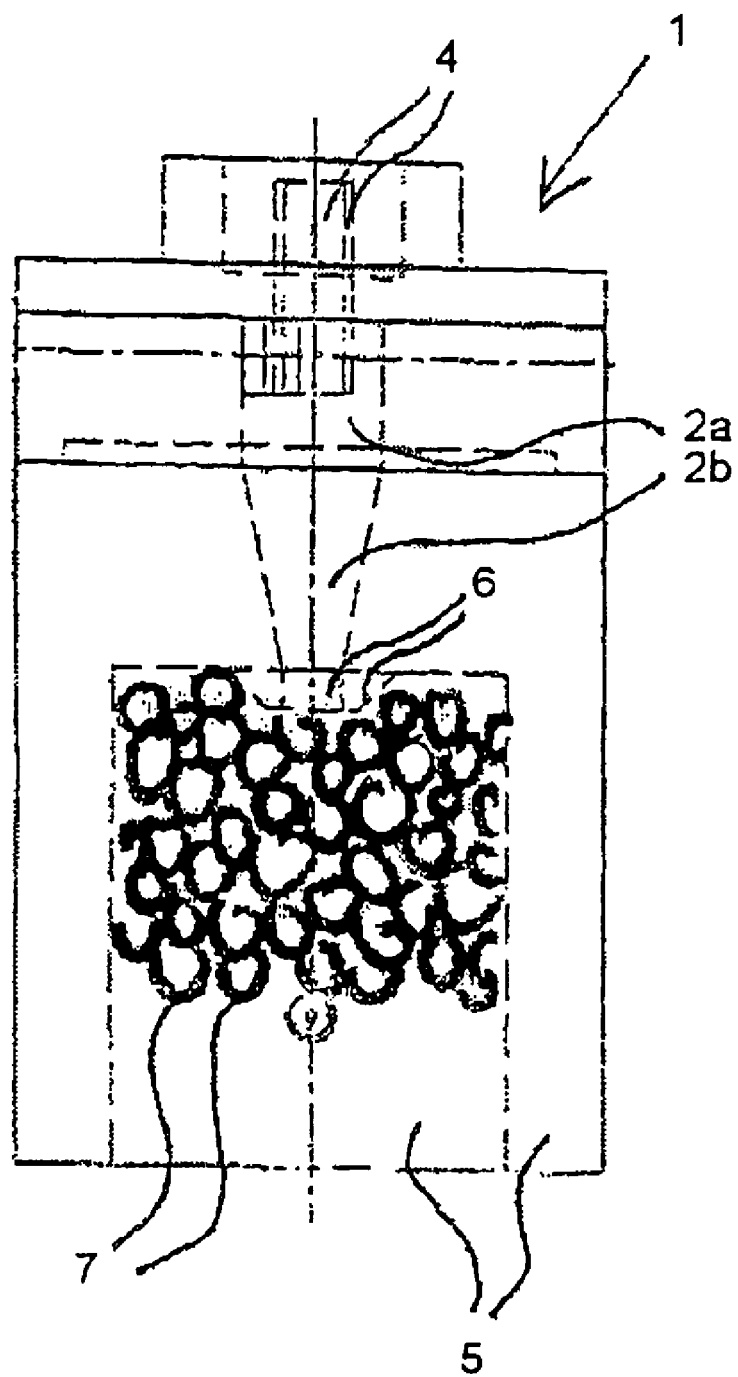
FIG. 5 shows a further liquid separator with glued-on fillers made of plastic material.

FIG. 5 shows a further embodiment of the liquid separator according to the present invention which operates with introduced fillers 7 made of ceramics. The basic construction and the basic mode of operation of the represented liquid separator hereby correspond to the cases represented in FIGS. 1 to 4. The introduced ceramic fillers 7 do not hereby fill the interior of the tank 5 completely but merely up to two thirds (in the upper region). In order to achieve filling of this type or filling of the interior of the tank 5 directly below the connection opening 6, the individual fillers are hereby glued to each other and to the internal walls of the tank 5. As described already with reference to FIG. 4, the individual ceramic fillers, on the basis of their geometry or surface configuration, form an arrangement which is suitable not only for interrupting the flow, dampening the flow and/or dampening the oscillations, but by means thereof or through them, also the oil within the tank interior 5 can be discharged downwardly towards the discharge device 8. This is achieved in the present case by an irregular volume or surface configuration of the individual ceramic fillers.

Figure 6A:
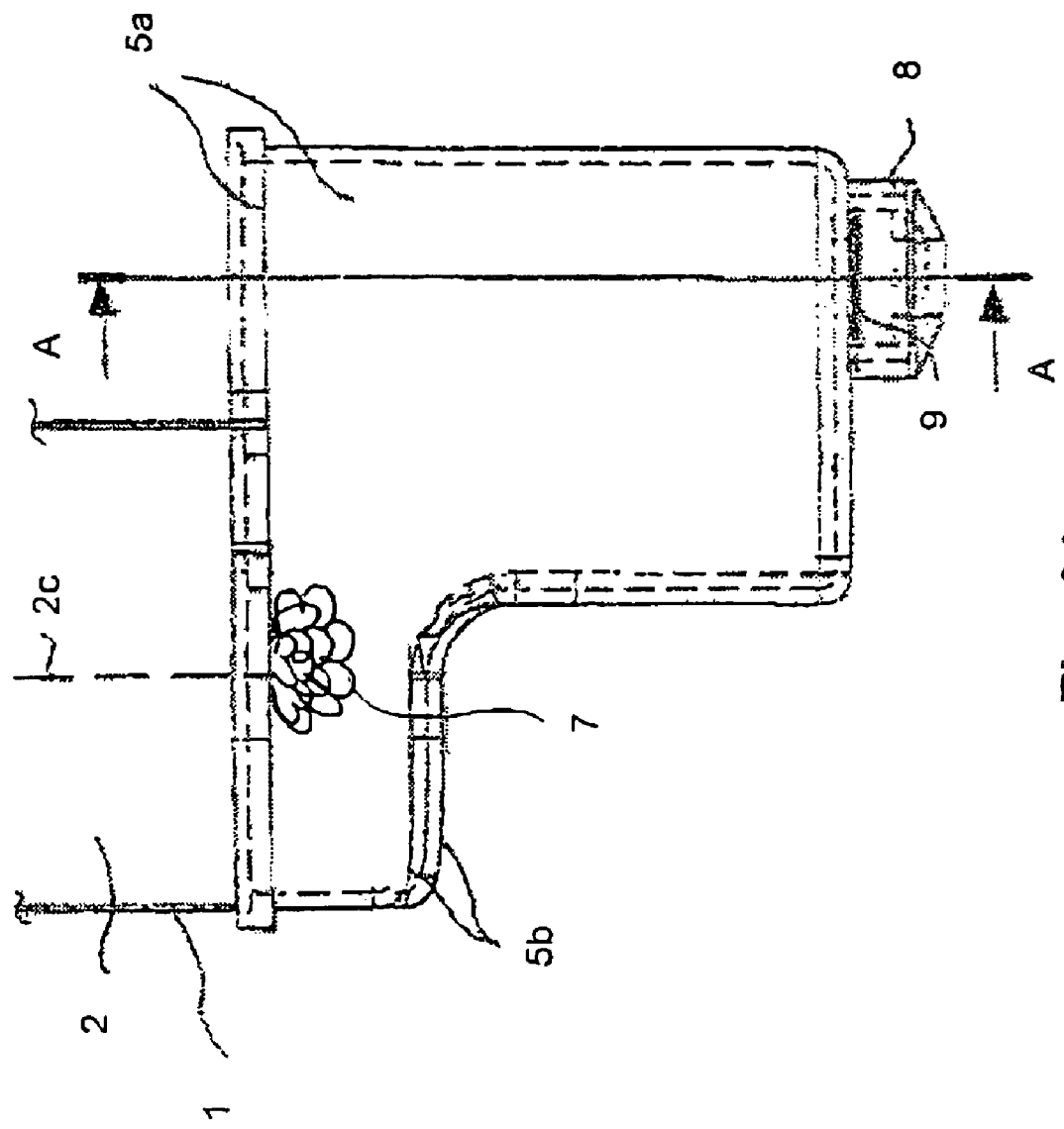
FIG. 6 shows a tank as it can be used within the scope of the invention.
Figure 6B:
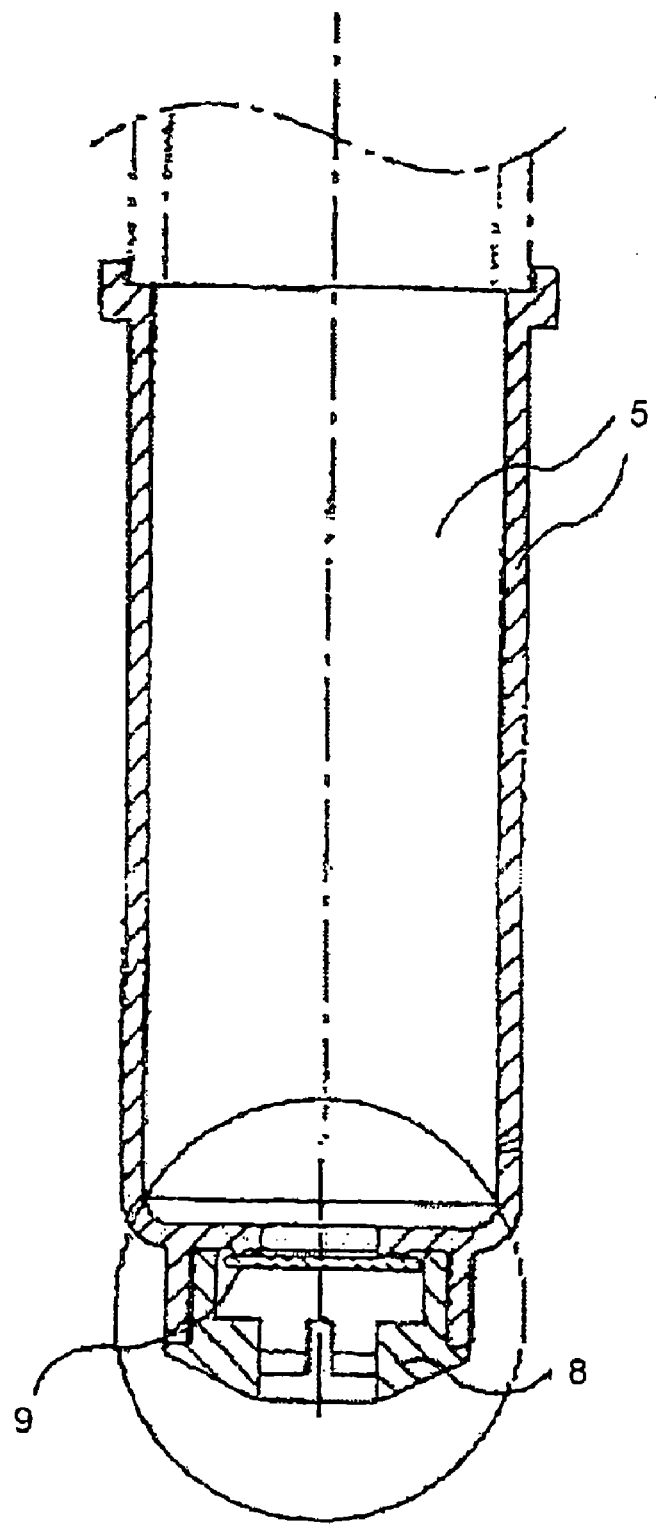

By means of a further example, FIG. 6 makes it clear that different tanks or tank configurations can be used for the invention. FIG. 6 shows a tank 5 with an irregular form which has a shallow portion 5b and a deep portion 5a. The shallow portion 5b is a transition region of the tank 5, with which the liquid components supplied by the cyclone 1 or the separating chamber 2 are conducted to the actual liquid storage region (deep portion 5a of the tank 5). The porous open-pore solid material 7 (securely glued plastic material non-woven material) is disposed here in the shallow portion 5b or in the transition region 5b. The cyclone 1 is disposed directly on the tank 5. The cyclone 1 is hereby disposed above the tank 5 such that approximately three quarters of the inner volume of the cyclone 1 are located above the shallow portion 5b of the tank 5. The representation concerns a simplified sketch in which the cyclone or the separating chamber 2 thereof is drawn only as a cylinder and in which the connection opening 6 is not shown. In the present arrangement, the cylinder axis 2c of the cyclone 1 does not coincide with centre of gravity of the tank 5 since the cyclone 1 sits offset laterally on the tank. Under the tank 5 or directly under the deep part 5a of the tank 5, the discharge device 8 with a valve 9 is sketched in. FIG. 6b shows a section in the plane A-A through the deep part 5a of the tank 5.

The invention claimed is:

1. A liquid separator comprising:
    a tank;
    at least one cyclone having a separating chamber and a transition region between said separating chamber and said tank;
    a gas supply, a single gas discharge and said tank, each of said gas supply, said gas discharge and said tank being in communication with said separating chamber;
    a connection opening disposed between said separating chamber and said tank, said connection opening being the sole outlet for separated gas from said tank to leave said tank; and
    a porous material at least partially disposed inside at least one of said tank, said connection opening, and said transition region of said at least one cyclone.

2. The liquid separator of claim 1, wherein said tank includes a liquid storage region and a transition region between said separating chamber and said tank.

3. The liquid separator of claim 2, wherein said transition region of said tank conducts the liquid components removed from a gas flow in said separating chamber into said liquid storage region.

4. The liquid separator of claim 1, wherein said porous material has a pore volume that includes at least approximately 30% pores to material.

5. The liquid separator of claim 1, wherein said porous material has an average pore diameter approximately 10% less than a diameter of said connection opening.

6. The liquid separator of claim 1, wherein said porous material has an average pore diameter approximately 0.1% less than a diameter of said connection opening.

7. The liquid separator of claim 1, wherein said porous material is a non-woven material.

8. The liquid separator of claim 7, wherein said porous material is a non-woven plastic material.

9. The liquid separator of claim 1, wherein said porous material includes a solid material formed from at least one of a metal, plastic, rubber, ceraic, glass, nylon, glass fiber, and foam material.

10. The liquid separator of claim 1, wherein said porous material is disposed only around a region proximate said connection opening of said tank and said separating chamber.

11. The liquid separator of claim 1, wherein said porous material generally fills a circumferential extent of a tank entrance of said tank.

12. The liquid separator of claim 1, wherein said porous material is at least partially fixed by at least one of welding, gluing, and clipping.

13. The liquid separator of claim 1, wherein said tank includes a discharging member distinct from said gas discharge for discharging liquid.

14. The liquid separator of claim 13, wherein said discharging member is one of a valve, a siphon, and a discharge pipe.

15. A method of separating a liquid-contaminated gas comprising:
    supplying the liquid-contaminated gas to a cyclone;
    separating liquid components from the liquid-contaminated gas;
    discharging a gas from said cyclone;
    moving said liquid components from said cyclone to a tank through a connection opening, said connection opening being the sole outlet for separated gas from said tank to leave said tank;
    holding in said tank said liquid components from the liquid-contaminated gas; and
    providing a porous material at least partially disposed inside said tank, said connection opening, and a transition region between said separating chamber and said tank of said cyclone.

16. The method of claim 15, wherein said porous material interrupts a gas flow to minimize the formation of turbulences.

17. The method of claim 16, wherein said porous material dampens a gas flow to minimize oscillating air columns in at least one of said cyclone, said tank, and said transition region.

* * * * *